Oct. 4, 1966    W. F. MATHEWSON    3,276,584
PULP SCREEN
Filed Oct. 1, 1963    5 Sheets-Sheet 1

FIG. 1

INVENTOR
*Wilfred F. Mathewson*
BY *Robert F. Churchill*
ATTORNEY

INVENTOR
Wilfred F. Mathewson
BY Robert P. Churchill
ATTORNEY

Oct. 4, 1966 W. F. MATHEWSON 3,276,584
PULP SCREEN
Filed Oct. 1, 1963 5 Sheets-Sheet 4

INVENTOR
Wilfred F. Mathewson
BY Robert P. Churchill
ATTORNEY

Oct. 4, 1966 W. F. MATHEWSON 3,276,584
PULP SCREEN
Filed Oct. 1, 1963 5 Sheets-Sheet 5

INVENTOR
Wilfred F. Mathewson
BY Robert H. Churchill
ATTORNEY

United States Patent Office 3,276,584
Patented Oct. 4, 1966

3,276,584
PULP SCREEN
Wilfred F. Mathewson, 21 Morrell St.,
North Weymouth, Mass.
Filed Oct. 1, 1963, Ser. No. 313,114
10 Claims. (Cl. 209—243)

This invention relates to a pulp screen and comprises a continuation-in-part of my copending application, Serial No. 17,819, now abandoned for Pulp Screen, filed March 28, 1960.

The invention has for an object to provide a novel and improved pulp screen which is characterized by a novel screening element particularly adapted for fine screening operations.

With this general object in view and such others as may hereinafter appear, the invention consists in the pulp screen and in the various structures, arrangements and combinations of parts hereinafter described and particularly defined in the claims at the end of this specification.

In the drawings illustrating selected embodiments of the invention.

In general the present invention relates to apparatus for the rejection of coarse matter from fibrous materials in fluid suspension commonly called "pulp screens," as most frequently used for the upgrading of cellulose fibers for the manufacture of paper, but also used similarly for selected and refined cellulose pulps for the manufacture of rayon, cellophane, cellulose acetate, nitrate, and the like. Such pulp screens may also be used with advantage for screening similar pulps having suitable short, very fine and wettable fibers and having a chemical composition other than cellulose.

The present invention further relates to improvements in pulp screens shown in my United States Patents, Nos. 2,450,838; 2,525,701; 2,574,977; 2,682,912; and 2,707,905, all of which show separate prescreening passages for each fine screening orifice. Said prior patents all embody a diverted flow type of screen wherein screening is accomplished by a narrow screening orifice formed by an annular space between two cylinders, the raw stock being delivered to the screening orifices by the separate prescreening passageways shown thereby by a diverted flow.

The unique arrangement of prescreening passageways in such prior patents was originally developed from considerations of improved stripping of the screen retained material.

In accordance with the present invention the screening element comprises a hollow cylindrical member provided with radial screening slots, each individual slot being compounded of three lengths, namely: an initial relatively wide straight run entrance portion; an intermediate tapered portion; and a relatively narrow fine substantially straight run screening portion having substantially parallel opposed side walls. The novel slots thus described may be referred to herein as "compound slots" to distinguish them from the conventional screening slots which do not provide a relatively wide entrance portion. As a result of the novel structure or slot geometry of the present compound screening slots it was found that very superior flow characteristics are obtainable. One of the requirements for superior flow characteristics met by the present compound slots is that there is full symmetry of the flow confining walls on both sides of a flow center plane both before and after the screen slot entry position for distances that are commensurate with the length of the fibers being screened. For example, the length of the fully symmetrical flow passage immediately preceding the screen slot entry position is preferably equal to or greater than the length of the fibers being screened, and the length of the screening slot is preferably greater than one half the length of the fibers being screened. Such flow characteristics are not obtainable in my prior diverted flow type of screening action where, for purposes of screen stripping, the flow was diverted sideways as it entered the screening orifices.

The screening of pulp fibers according to their diameters is beset with many difficulties, to offset which there are a few, but only a few, favorable factors. A typical good cellulose pulp fiber might have a length 100 times its diameter, the length being in a range of from .040 to .100 inch and the diameter less than .001 inch, which is generally finer than human hair.

Fortunately, cellulose fibers, normally very flexible and soft, also appear rather slippery when in a water suspension, due, I believe, to a protective sheath of hydration. However, if the fibers start to pile up at a screening orifice this loosely held sheath of hydration may easily be squeezed away so that the fibers may tend to bond somewhat to each other or to the screening wall. It is, therefore, a cardinal principal of pulp screening that screen retained material be removed promptly. This is usually done by backwashing in the prevailing commercial practice. However, the difficulties are such, with good fiber being occluded on screen retained material that, to my knowledge, the finest available screening in the present commercial practice is with .006 inch slots, many times the diameter of the good fibers being screened.

Another major consideration in pulp screening is that, as a pulp flow stream contacts, the pulp fibers tend to align themselves with the flow. As a practical matter, this is an advantage since otherwise the chances that a pulp fiber will be neatly presented to a matching screen slot, from a stock with randomly orientated fibers, are very remote. Ideally, it would seem that this alignment of the fibers with the flow, so that the fibers are presented straight and endwise to the screening orifice, could be a completely fortunate solution to many of the problems of pulp screening. Unfortunately, however, in conventional commercial screens of the prior art, it appears that the flow convergence occurs mostly close to the slot entrance and when the spacing between the slots is made large as compared to the slot width, to increase the flow convergence, there appears to be an increasing tendency for some fibers, in following the natural flow lines, to attempt to enter the screening slot obliquely. The major hazard here seems to be that as a fiber is entering obliquely its nose or leading end portion projects into the faster moving midstream flow, tending to flex the fiber forward so that somewhere along the length of the fiber it may be pressed against the screening edge, squeezing away the protective sheath of water so that the fiber tends to stick to the adjacent screen plate face as well as hang on the screening edge. If not removed promptly, the whole tail or trailing end of the elongated fiber may adhere, albeit very lightly, to the screen plate in this manner. The screen entry problem thus presented, together with the problems involved in the prompt removing or stripping of screen retained fiber and its collection, have been major obstacles in extending pulp screening into finer screening ranges.

In the prior art screening structures the fluid flow and its fibers in suspension may also enter a screen slot obliquely when the bulk of the adjacent raw stock is placed in relative motion to the screening wall as when the raw stock is flowed over a screen plate or when a screening cylinder is rotated in the raw stock. This is not always an adverse factor, notably when the screen plate is made appropriately thin. Some success seems to have been obtained in the known commercial practice by literally sifting the stock through, for example, by giving the screen plate an oscillatory motion so that a pulp fiber that may be hung up on a screening edge by one swing of the oscillatory action may be freed by the following reverse swing so that it may yet enter the screening slot if not oversize. This type of screen is not generally used for extremely fine screening.

In this latter type of screen, as well as in others used for fine screening in contradistinction to some used for coarse screening, all as used in the present commercial practice, the raw stock is slowly flowed along the screen plate or cylinder with the acceptable stock being drained from the raw stock through the screening element as the flow progresses so that the raw stock flow along the screening element tends to become the rejectable portion only and may thus eventually be removed from the screening equipment. This procedure is presumed to be inefficient in that any coarse particle may be subject to presentation to the screening element a number of times to eliminate it; however, it must be admitted that with clear water additions to the raw stock flow as it progresses over the screening element a very clean separation of the reject matter from the acceptable stock is theoretically possible. To my knowledge the separation is not completed in commercial practice though clear water additions are frequently made principally because the rejects are usually salvagable or usable as low-grade stock. In the pulp screen of the present invention a coarse particle need be presented only once to a screening orifice; some raw stock may be carried away with it as it is being removed, but when favored with an initially adequately diluted raw stock, it seems that a net gain in efficiency should result in cases of some interest.

In the operation of the pulp screen shown in the drawings the raw stock enters the casing in which the hollow cylindrical screening element is mounted, the raw stock filling the space between the inside wall of the casing and the outside diameter of the screening element. The raw stock thus fed to the casing passes into the screening slots, the acceptable fibers passing through the slots into the interior chamber of the hollow screening cylinder from which the acceptable stock is discharged, the unacceptable portions of the stock being rejected by the slots. The screening element is rotated during the screning operation, and the slots are backwashed to remove the reject from successive slots each cycle of operation, the backwashed material being collected and carried away.

When operating conditions permit it is of advantage to have the raw stock enter the slots in a true radial path except for the natural convergence of the flow from the casing into the slots. It will be apparent that any relative movement between the rotary screening element and the flow of the raw stock may cause some fibers to be caught on the edges of the wide entrance slot. In accordance with another feature of the present invention, provision is made for avoiding this condition by substantially controlling the speed of rotation of the screening element and the rate of flow of the raw stock through the casing so that there will be no general relative circumferential movement between the raw stock and the rotary screening element during the screening operation whereby to permit a direct radial flow into the slots as will be hereinafter more fully described.

Figure 1:
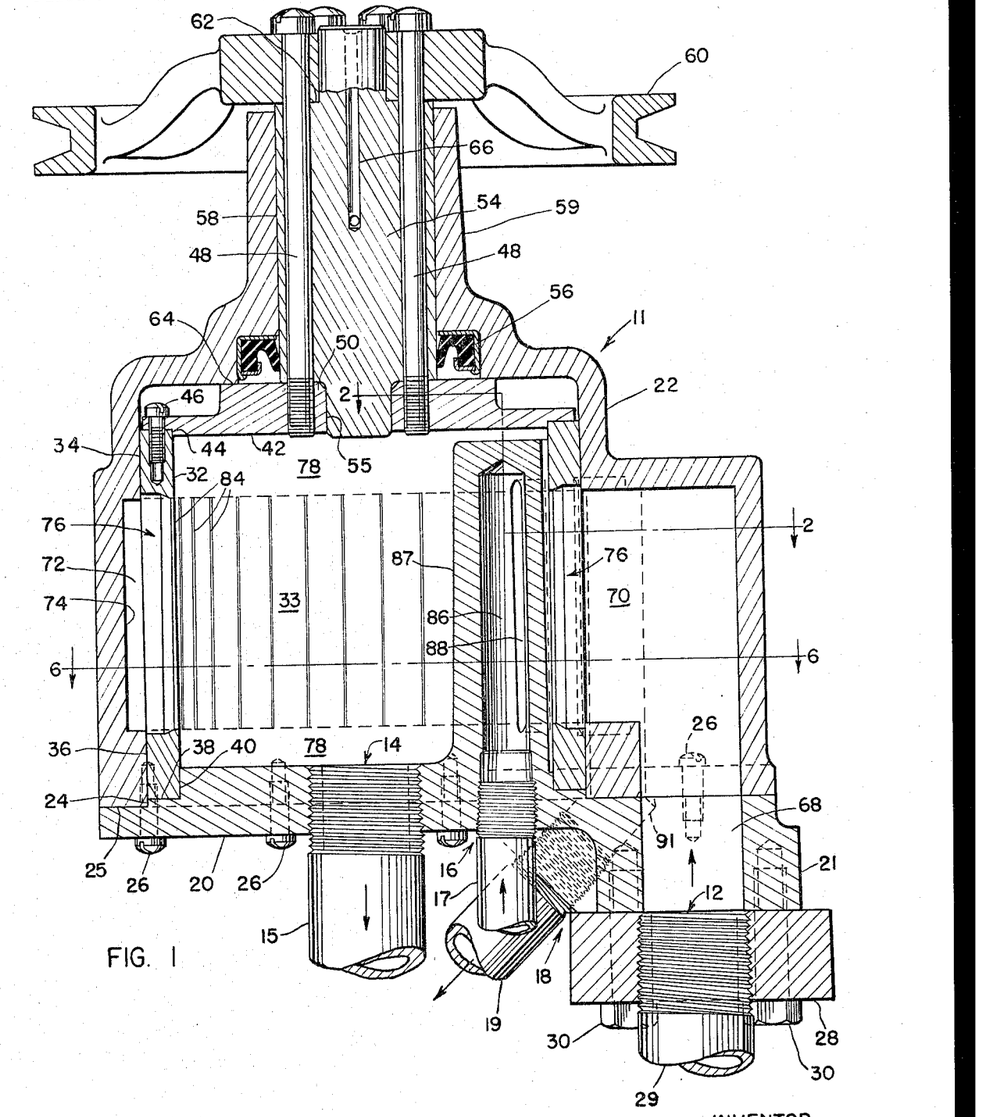
FIG. 1 is a cross sectional view of a pulp screen embodying the present invention as taken on the line 1—1 of FIG. 2, and which illustrates the flow passages from a raw stock inlet to the screened stock outlet.
Figure 2:
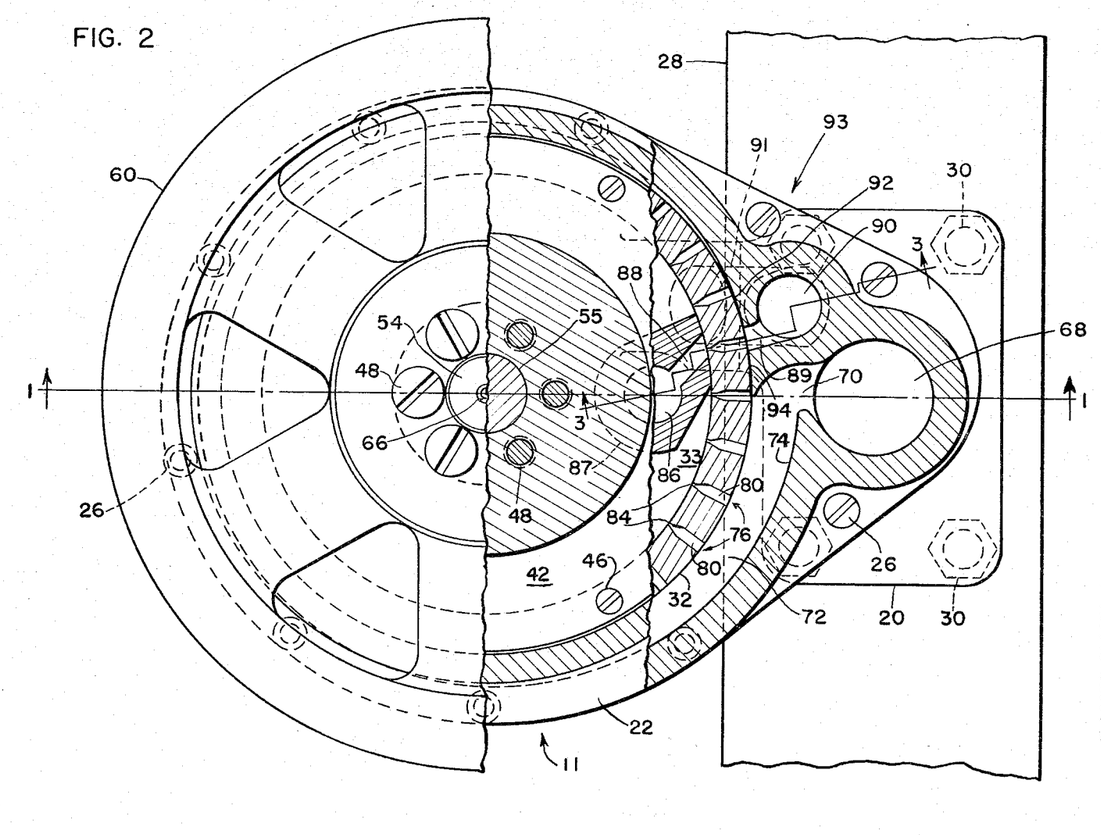
FIG. 2 is an end view of the pulp screen partly in cross section as seen from the line 2—2 of FIG. 1.
Figure 3:
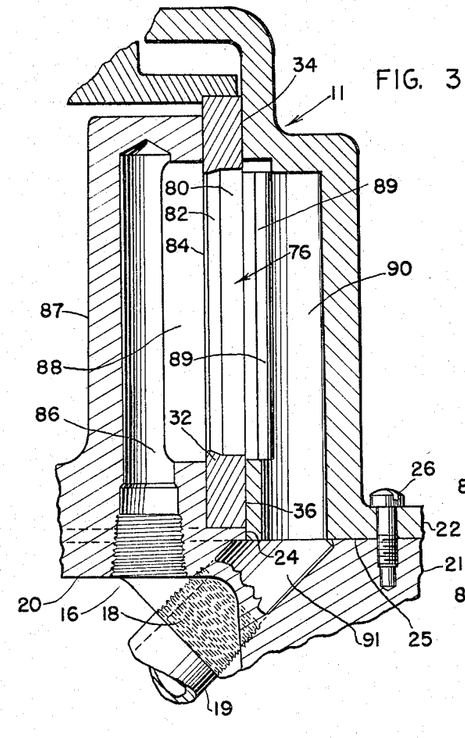
FIG. 3 is a cross sectional view of a portion of the pulp screen taken on the line 3—3 of FIG. 2 showing the backwash flow passageways.

Referring now to the drawings and particularly to FIGS. 1, 2 and 3, the pulp screen structure therein shown is embodied in a one-stage type of pulp screen and includes a hollow casing indicated generally at 11 having a raw stock inlet indicated at 12 for receiving the raw stock to be screened and an accepted or screened stock outlet indicated at 14, threaded for connection to external piping 15 through which the screened or accepted stock is discharged. The casing 11 has a wash water inlet indicated at 16, threaded for connection to external piping 17, and a tailings or reject stock outlet indicated at 18, also threaded for connection to external piping 19, through which the screen retained material, as flushed away from the screening orifices with wash water, is discharged from the casing. All the casing inlets and outlets for fluid flows are located in an end member 20 of the casing 11. A casing shell 22 comprises the balance of the casing 11. The end member 20 extends slightly into the shell 22 at a neatly fitted pilot diameter 24 and abuts the shell at a face 25. The end member 20 is otherwise located on and retained to the casing shell 22 by screws indicated typically at 26. The casing 11 at its end member 20 is provided with a flange portion 21 extended laterally therefrom and attached to a supporting beam 28 by screws indicated at 30. The supporting beam 28 is provided with a hole, threaded for connection to external piping 29 aligned with the raw stock inlet 12 so that the supporting beam 28 serves as a pipe flange for connected raw stock piping as well as a support member.

Internally of the casing 11, a screen cylinder 32 is rotatably journalled in the casing shell 22 at journal bearings 34 and 36. One end of the cylinder bears against a thrust bearing face 38 formed on the casing end member 20 as illustrated. The interior of the screen cylinder 32 is also journalled on a short journal bearing 40 at a shoulder portion of the casing end member 20.

At the opposite end of the screen cylinder 32 a cover 42 is provided which extends slightly into the screen cylinder 32 at a pilot diameter fit 44. The cover 42 is otherwise positioned on and secured to the screen cylinder by screws indicated at 46. Thus, the annular screen cylinder, forms a chamber 33 into which the screened pulp flows to be discharged through the outlet 14. The cover also serves to drive the screen cylinder, being attached with screws indicated at 48 to a shoulder portion 50 of a drive shaft 54 and centered on said drive shaft by a pilot diameter 55. The drive shaft 54 extends through a seal element 56 and journal bearing 58, both positioned in a hub extension 59 of the casing shell 22, to mount a drive pulley 60 on a shoulder portion 62 of said drive shaft. The pulley 60 may be belt driven by an electric motor or other source of power with appropriate intermediate driving equipment. It will be noted that the screws 48 serve to retain the drive pulley as well as the screen cylinder cover 42 to the drive shaft 54, extending in a coaxial direction through the said drive shaft for this purpose. A thrust bearing face 64 is provided between the screen cylinder cover 42 and the casing shell 22. An oil hole 66 is provided for the lubrication of the journal bearing 58.

The pulp flow from the raw stock inlet 12 to the accepted stock outlet 14 will now be described. From the inlet 12 an inlet passage 68 continues through the casing end member 20 into the casing shell 22 whence the raw stock is side ported into a curved passage 70 and thence into a header passage 72 between the shell 22 and the screen cylinder 32. The contour of the casing side wall 74 of the passage 72 is important for reasons that will be explained presently.

In operation the raw stock is continuously withdrawn from the header passage 72 into the entrances of the prescreening portions of the compound screening slots indicated generally at 76 formed in the screen cylinder 32. The exact nature and structure of the compound screening slots 76 will be hereinafter described in connection with the actual screening operation. The entrances to the compound slots 76 are preferably equally spaced around the periphery of the screen cylinder. In order to minimize any tendency for fibers to be caught, even momentarily, on the edges where the compound slots start at the periphery of the screen cylinder, it is for general reasons preferable that the compound slots extend inwardly from their entrances in true radial fashion and, more particularly, that the raw stock flows towards the compound slot entrances in the direction in which the screening wall is slotted except for the flow convergencies necessary for the raw stock entrance into the compound slots. This would be a simple matter except that in the present instance, for purposes of screen stripping, it is desired that the screen cylinder be rotatable while a stationary tailings receiver is closely positioned to the periphery of the screen cylinder.

One feature of the present invention is that the desired type slot entry flow may be closely approximated by matching, as closely as is practical, the circumferential velocity of the flow in the header passage 72, in those positions in which it is in contact with the periphery of the screen cylinder, with the velocity of the screen cylinder, both the screen rotational speed and the rate of admittance of the raw stock into the casing being adjustable for this purpose, and as is also required, the side wall 74 is formed as predetermined to be necessary so that the header passage contracts in a practical manner to compensate for raw stock progressively withdrawn into the screen cylinder while the cylinder advances, the screen cylinder contacting flow velocity being determinable from the residual bulk flow in the header passage and the flow cross section. It may be noted that, because of the retarding effect of stationary walls common to all confined flows, the circumferential flow velocity at the screen periphery will be found to exceed somewhat the average flow velocity through the passage cross section, and it is rather the circumferential flow velocity at the screen periphery that is to be matched to the screen peripheral velocity of the screening structure. In this desired relationship the raw stock flow and the periphery of the screening cylinder become relatively stationary to permit a true direct flow into the screening slots.

Regarding the problem of fibers being caught on the edges of the compound slots, it may be stated that it is primarily not so much that fibers retained on the compound slot entrance edges cannot readily be dislodged, it is rather that when they do become dislodged, particularly when a mat of fibers has been allowed to accumulate, that such fiber accumulations have no great opportunity to be again dispersed in the flow before they reach the screening position in the compound slot screen assembly under consideration so that good fiber will be unnecessarily rejected, and the screenig process will be subject to unnecessary load. Regarding the possibility that fibers retained on the compound slot entrance edges might accumulate enough to interfere with the mechanical operation of the screen, this has been found to be no problem in tests of the usual short duration. In the absence of a bulk raw stock flow over and across the wide entrance slot 80, as a result of matching the rate of flow with the rotation of the screen cylinder, conditions are favorable; the flow convergence into the wide slots is moderate, and only a small fraction of the fibers will travel hazardously close to the entrance edges, again because of the width of the entrance. Against the possibility that there might be trouble on this point with continuous operation, a potential corrective procedure involving some modification of the screen speed determining principle described above will be described hereinafter in connection with the backwashing techniques.

Figure 4:
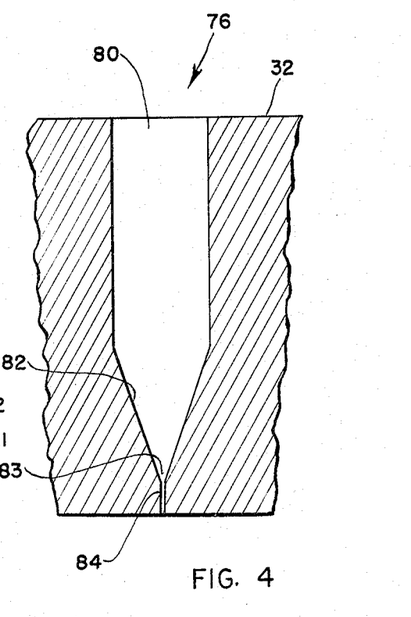
FIG. 4 is an enlarged cross sectional view of one of the novel screening slots formed in the screening element shown in FIG. 2.

The compound screen slots 76 will now be described. As may be seen in the greatly enlarged cross sectional view, FIG. 4, each slot consists of an initial relatively wide straight run entrance portion 80 at the raw stock flow entrance end followed by a taper portion 82 to the screening orifice 83 and a relatively narrow fine substantially straight run slot screening portion 84 having substantially parallel opposed side walls extending from the screening orifice 83 to the compound slot termination, all symmetrically disposed about a midstream center plane on both sides thereof. For machining and operational convenience the plurality of slots required for practical purposes are preferably equally spaced around a screen cylinder, such as is indicated at 32, with the raw stock inlets on the outer face of the cylinder and the accepted stock outlets on the inner face of the cylinder with the slots extending generally in the screen axial direction between the solid end ring portions 78 of the screen cylinder against which they terminate although other arrangements permitting backwash facilities sufficiently closely spaced for adequate washing fluid economy are within the scope of this invention.

Figure 5:
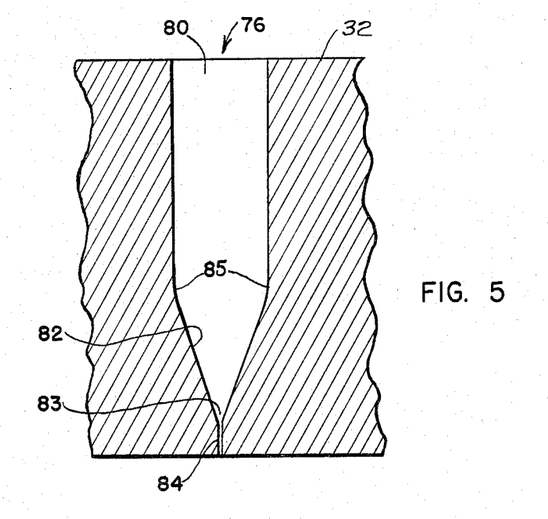
FIG. 5 is a similar view showing a modified form of screening slot.

In a modified form of compound slot structure, as illustrated in FIG. 5, the junctions of the wide side walls of the slot 80 with the adjacent ends of the tapering portion 82 may be rounded as indicated at 85. Otherwise, the slot may be the same as that shown in FIG. 4.

A comparison of the present compound screening slot with the prescreen slots shown and described in my earlier patents, above referred to, will serve to point up the novelty and advantages of the present screening slot. By referring to such prior patents it will be seen that all involve what I now call diverted flow screens in which, to obtain the screen stripping action there desired, a spaced wiping face is provided at the termination of raw stock inlet slots with such spacing between the termination of the inlet slots and the wiping face providing the screening aperture and said wiping face being further provided with a through slot through which coarse material accumulations at the screening aperture may be cyclically rejected. In such screens the accepted stock flow away from the screening aperture must by practical necessity be diverted from the direction in which it approaches the screening aperture through the said inlet slot.

This is of course in high contrast to the present compound screen slot 76 where the flow center planes of both the prescreen portion 80 of the slot and the post-screen portion 84 of the slot are in direct alignment. This is important because it has been found in the present invention that screen slot obstructing coarse fibers and fiber bundles extend back from the screening orifice 84 suspended in a near midstream position, a position contraindicated with my diverted flow screens. There appears to be a positive force towards midstream exerted on fiber accumulations in this position; as a fiber accumulation grows on one side of the slot entrance, that is, on one side of the midstream slot entering flow, the fibers presumably accumulating on the outer or wall side of prior debris accumulations, fibers on the slot entering flow side have been seen to become disengaged from the debris and enter the screening orifice with the flow.

In all of my above listed United States patents, with the exception of Patent No. 2,707,905, the sole screen stripping means is that peculiar to my diverted flow screens, there being no backwashing provisions. The use of a prescreening or inlet passage, one for each screening orifice, though now with some apparent deficiencies, was one unique development; the additional occasional use of backwashing to flush the there diverted flow screen type inlet slots, supplementing more frequent diverted flow screen type screen stripping in what remained, by the description of Patent No. 2,707,905, a diverted flow type screen, was a notable advance towards a commercially useful pulp screen; and the present refinement of the prescreening passage geometry and the positioning of the screening orifice definitely within the same structure as the prescreening passage and the adaptation of this to a separate pulp screening facility, with the resulting economy of simplification in an alternate construction, may well be the most significant commercial development of all for the screening of the better pulps.

Certain presumptions and the reasons for them presently will be considered. The observation of the tendency of coarse fibers or fiber bundles, those unable to enter the screening orifice, to lie with their unentered portions near midstream in the approaching raw stock flow, has already been noted.

In observing the action of the pulp being screened in a windowed test model it was noted that in pulp suspensions travelling at velocities, such as those used in the very finest pulp screening, good, fine individual fibers cannot practically be seen with the naked eye. Magnifying glasses or microscopes do not help very much because the apparent velocities as well as the apparent diameters are increased. If the flow is very slow or, particularly, if the pulp suspension is allowed to stand for a minute, individual fibers may be seen. Whether they are actually more visible in the quiescent suspension, perhaps due to incipient flocculation, or whether they merely give the eye more opportunity to focus on them, I do not know. Because of all this, in such phenomena as is here described, it is only at the fiber acumulation at the screening orifice 83 that fibers were distinguishable, and there, mostly as protrusions from debris and shadowy since the viewing was by transmitted light.

In the same windowed test model that the above-described phenomena was observed with just under one-quarter inch thickness of very dilute pulp suspension, another vague and variable phenomena seemed barely discernible, an active flow, probably fiber flow, convergence from the wide slot entrance towards the screen slot entrance, this active flow being barely marked by a rather ripply appearance; there could not have been any surface waves as the space between the top and bottom window was filled with fluid except for occasional air bubbles. It is possible that this phenomena was due to very minute air bubbles as occasionally small but discernable air bubbles could be seen to follow the same activated flow pattern. It should be noted that this activated flow pattern was not sharply defined and was variable in appearance. There may well have been a continuous decrease of forward flow velocity flow from the flow axis to the channel walls so that the apparent width of the activated flow stream may be determined largely by the limits of visual observation at any particular time. The zones on either side of the "activated" flow pattern seemed to be quite clear. In the above test the raw stock pulp consistency was very low, around .05 percent. This latter observation is in accordance with the theory that has been advanced that the flow occurs between cushions of fluid. However, it now appears quite certain that these cushions cannot be "dormant," as previously supposed, and with their apparent clarity it is dubious that they may be defined as being of the same composition as the raw stock.

Alternatively, it may be theorized that it is the fibers, with only the closely retained water on each fiber, that are worked to a midstream position. This would explain the apparent clarity of the relatively inactive "cushion" zones. Either theory would be difficult to correlate with current theories.

The considerations involved in proportioning the compound slot will now be described. Two complete screen cylinders were made for test purposes. The first had five-eights of an inch long compound slots, each with a one-eighth inch wide inlet slot and generally .011 to .012 inch wide fine or screen slot, the latter approximately three-sixteenths of an inch long. The second, shown on the drawings herewith, have three-eighths of an inch long compound slots, each with a three thirty-secondths of an inch wide inlet slot and a generally .004 to .005 inch screen slot, the latter approximately one thirty-second of an inch long. In each case the convergence angle of the intermediate taper portion was twenty degrees per side, forty degrees total. The length of the taper portion is determined by the convergence angle and the width convergence. The length of the straight inlet slot portion is the overall compound slot length less the lengths of the fine slot and the taper slot portions of the compound slot.

The practical limit for fine screening has not been determined for the compound slot. However, it is known from experiences with the diverted flow screen that fluid viscosity effects are serious with finer than .002 inch screening. The fine slot should be kept of limited length for the same reason. It has been stated in the foregoing that the fine screen slot length is preferably at least one half the length of the fibers being screened; as a practical matter the minimum fine slot length should be at least equal to or greater than the length of the fibers being screened to provide for loss of length by edge erosion.

Regarding the convergence angle of the taper portion of the compound slot, it will be noted that a very slow convergence leading to a screening aperture may result in coarse material being wedged tightly between the side walls of the converging flow from which position it may be difficult to remove, notably in the case of coarse material of infrequent occurrence where the backwash flow has generally ample opportunity to pass on either side of the coarse material. Excessively high backwash flow requirements would be a very adverse factor economically. The slowly tapered plain inlet slots introduced in my United States Patent No. 2,525,701 were without the benefit of any backwash provisions so that the amount of slot convergence was severely limited. It now appeared that the tapered inlet slot was of material advantage in reducing washing flushing flow requirements by increasing the flow velocity in the critical regions and mechanical slot cleaning was introduced in my United States Patent No. 2,682,812 to permit an increased slot convergence without backwashing. It will be noted that the inlet slot side walls are here curved to provide for the entry, gear tooth fashion, of a cleaning blade. In close succession, my United States Patent No. 2,707,905 shows an alternate inlet slot cleaning provision, a novel adaptation of backwash facilities to a diverted flow type of screen; the significant screening facilities remain at the entrances to the circumferential screening space peculiar to my diverted flow type of screen.

The moderate twenty degrees per side flow convergence shown in the present drawings is designed to prevent any great number of fibers from attempting to follow flow convergence lines at the screening orifice that are sharply curved. Failure of the fiber to execute the flexing thus required may result in the fiber being hung up on the screening edge or becoming entangled with other fibers as its nose or leading end portion enters into the faster moving midstream flow. On the other hand, short fibered pulp might screen more freely with a larger convergence angle.

The straight run wide slot 80 preceding the taper portion 82 of the compound slot 76 permits the compound slot to be extended to the desired overall compound slot length, i.e., screening wall thickness, without unecessarily increasing the slot volume as would occur if the side walls of the taper portion were to be extended to obtain the desired overall slot length. This is important because it reduces the backwash water requirements and renders the salvage of the backwashed screen retained material easier. However, the principal advantage of this construction seems to be that the superior performance of the compound slot appears to depend upon this straight run entrance portion 80 in part. The width of the wide raw stock entrance portion 80 of the compound slot has been a compromise between easy raw stock entrance and limitation of the slot volume as determining backwash fluid requirements.

The overall compound slot lengths have been determined primarily from the desirable screen cylinder wall thickness with satisfactory results. In practice one model has a five-eighths inch wall thickness which might well be reduced to nine-sixteenths or even one-half inch since the fine slot length is much greater than it needs to be; the critical prescreen portion of the compound slot need not thereby be disturbed.

The spacing between screen slots on the screen cylinder circumference may also be reduced from that shown on the drawings; this rather wide spacing arose from considerations of machining precision, and with improved tooling the spacing between slots may be reduced enough to permit sufficient additional slots to increase the screen capacity considerably.

The backwash flow passage interiorly of the casing 11 may be seen in FIGS. 2 and 3. From the backwash flow inlet 16 in the casing and member the flow proceeds directly along an inlet passage 86 interiorly of a wash water emitting tube 87 comprising an integral part of the casing end member 20 extending in the assembled screen along the interior of the screen cylinder 32, the latter being rotatable closely adjacent the wash water emitting tube 87. The backwash flow issues from the inlet passage 86 through a side outlet porting slot 88 that is suitably extended so that the backwash fluid may be introduced directly into the full length of the fine slot end portions 84 of the compound slots 76 as they pass by the backwash station.

From the opposed wide slotted ends 80 of the compound slots the backwash fluid, together with screen rejected material and trapped raw stock, this whole aggregate being termed the "reject stock" or simply the "rejects," is transferred into a stationary receiving slot 89 closely positioned to the outer periphery of the rotatable screen cylinder, said receiving slots 89 being suitably extended in a direction substantially parallel to the axis of the screen cylinder to receive directly the reject stock as the compound slot wide ends successively pass the receiving slot 89. The stationary reject receiving slot 89 is in direct communication with a reject stock collector passage 90 that serves for further passage for the reject stock.

Both the receiving slot 89 and the passage 90 are formed directly in the casing shell 22. In the casing end member 20, as it abuts the casing shell, the reject flow continues from the passage 90 into the angle passage 91, see FIG. 3, towards its threaded end portion 18 that serves as the casing reject stock outlet, the threaded end portion 18 being engageable with reject removal piping 19. The angle passage 91 is positioned to be open to the reject collector passage 90 and is inclined at an angle so that connecting piping and fittings therefor will not interfere with other piping and fittings that may also be attached to the casing end member 20.

In operation the stationary backwashing station, indicated generally at 93 serves to backwash the screening slots 76 in the rotating screening element 32 sequentially so that each slot 76 will have a backwash flushing for each rotation of the screening element at a predetermined pressure and volume. Periodically, a relatively fast or strong backwash flow may be provided for one or more cycles of operation to effect clearance of the wider portion 80 of the slot so as to prevent too great a concentration of solids in this area.

The spaced relationship between, variously: the termination 92 of the header passage wall 74 where it approaches closely to the screen cylinder; the reject receiving slot 89 at its flow entry position close to the screen cylinder; the casing wall portion indicated at 94 at its position also adjacent the screen cylinder and lying between the reject receiving slot and the header passage 72 at its raw stock entry end and the various clearances between these structural portions and the screen cylinder may be subject to modification in various models to accommodate varying operating conditions, the wash water emitting port and its adjacent sealing faces abutting the interior of the screen cylinder also being modified for conformity to these changes. It will be observed that the header passage 72, as illustrated, is provided with a relatively small convergence angle, although in practice it may be desired to increase the convergence angle to permit greater screen capacity. In practice the wall portion 94 will be as closely fitted to the screen cylinder as running conditions permit to prevent raw stock leakage from the header passage into the reject receiving passage 89.

It has been stated that there may be a corrective should the condition arise that fibers retained on the compound slot entrance edges accumulate enough to interfere with the mechanical operation of the screen. Small fiber accumulations here might be chewed up by the backwash apparatus without noticeably affecting the mechanical operation or significantly affecting the quality of the accepted stock. One expedient to correct such condition, where an excessive accumulation of fibers are retained on the compound slot edges, is to slow down the screen cylinder rotation relative to the rate of raw stock flow in the header passage 72 so that all fiber deposits will tend to be on the forward edges of the slot entrances and none on the trailing edges. These deposits on the forward edges could be wiped by the reject receiver into a backwashable position if clearance is provided under the first lip 92 of the backwash receiver at the termination of the header passage 72. Normally, this portion would be closely fitted to prevent raw stock leakage into the reject receiver. Forward edges are definable as those edges on the sides of the compound slot entrances that are in the advance positions when the screen is placed in proper rotation. It is obvious that to slow down the screen cylinder for this purpose would be somewhat in violation of the principle of compound slot stock entry held to be generally preferable. Once the principles involved are understood the best compromise solution is readily determinable experimentally.

Figure 6:
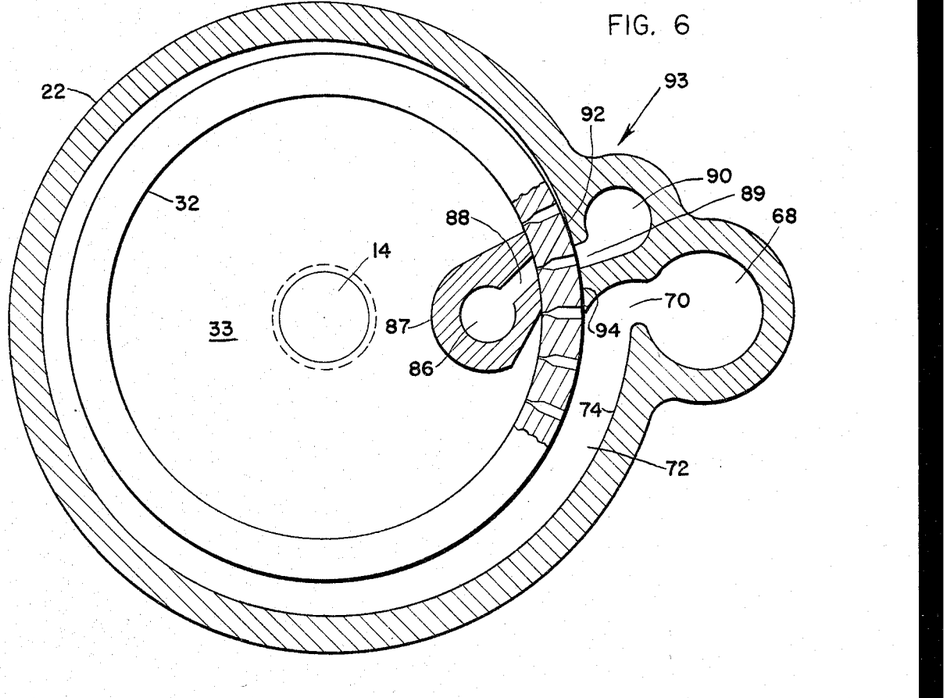
FIG. 6 is a cross sectional view taken on the line 6—6 of FIG. 1 showing the porting to the screening element, and illustrating a progressively diminishing path formed by the casing through which the suspended raw stock is flowed.
Figure 7:
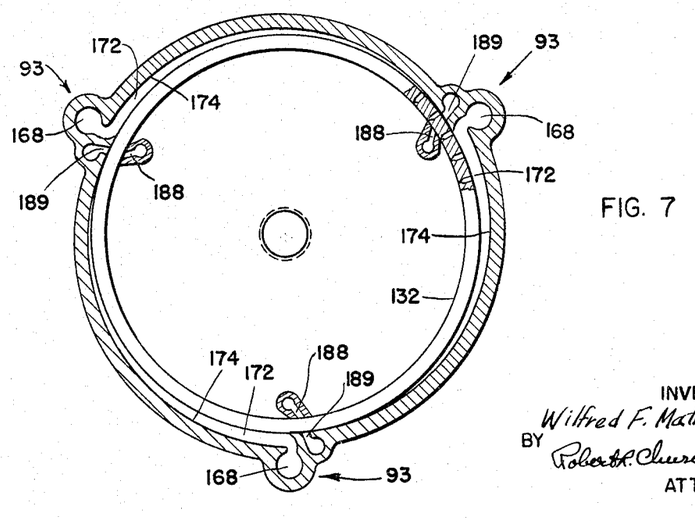
FIG. 7 is a cross sectional view similar to FIG. 6 showing a modified form of casing embodying a plurality of raw stock inlets and backwash stations.

In one embodiment of the invention the porting slot 88 that receives and the porting slot 89 that removes the backwash flow through the compound slots 76 in the screen cylinder, together with connected passages in the casing and the immediate structure in which these are all formed, may be considered as a group to constitute a backwash station 93 as shown in FIG. 6. In a modified form of the invention more than one backwashing station 93 may be arranged around a screen cylinder; to increase the screen capacity by increasing the screen cylinder diameter without increasing the screen peripheral speed; to provide for more frequent backwashing without increasing the screen rotational speed; or to correct for the unbalanced radial forces exerted on a screen cylinder at a backwash station because of the various hydrodynamic pressures. FIG. 7 shows in cross section the modifications necessary to accommodate a plurality of backwash stations 93 in one casing shell, the modified screen cylinder being indicated at 132; the modified raw stock inlet passages at 168; the modified raw stock header passages at 172; the modified header passage casing wall at 174; the modified wash water emitting ports at 188; and the modified rejecting receiving ports at 189. Corresponding modifications required in the casing end member 20 will also be apparent.

Figure 8:
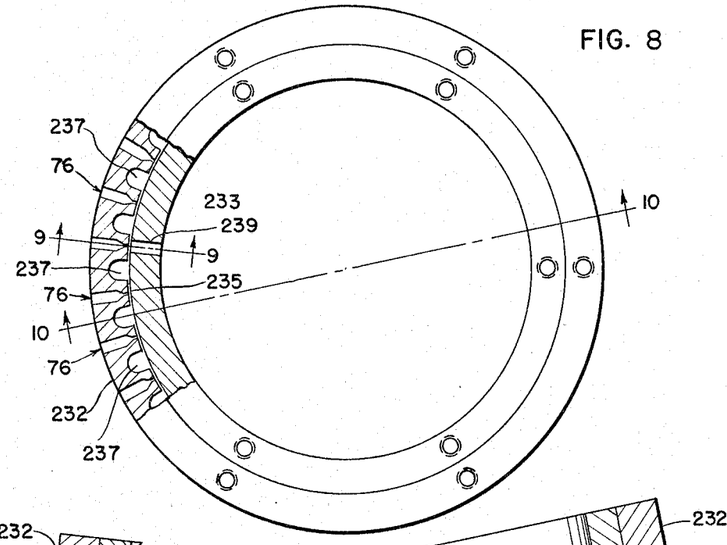
FIG. 8 is an end view partly in cross section of the present screening element as embodied in a modified form of pulp screen of a so-called "diverted flow type" having a second screening stage.
Figures 9, 10:
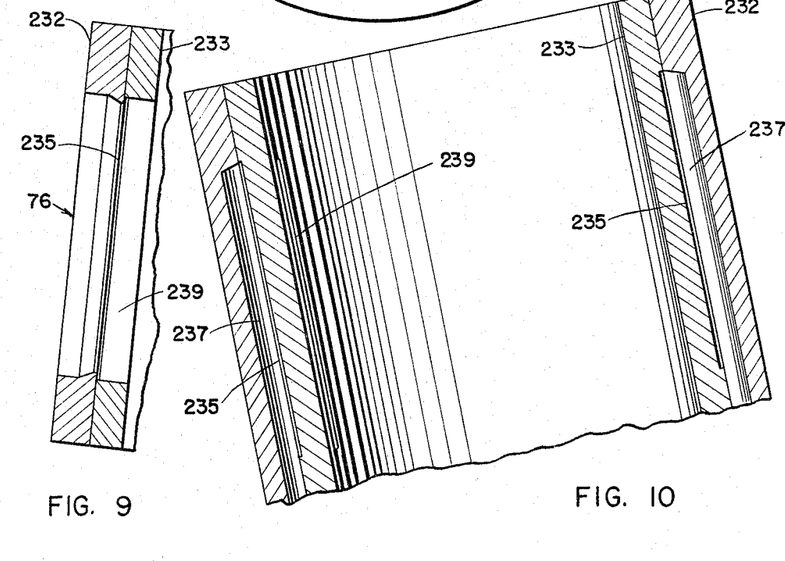
FIGS. 9 and 10 are cross sectional views as taken on the lines 9—9 and 10—10 of FIG. 8.

FIGS. 8, 9 and 10 show a modification of the screen cylinder 32 wherein the compound slot screening action described above is embodied in a diverted flow type of pulp screen shown typically, with backwashing, in my United States Patent No. 2,707,905 to optionally provide a two-stage screening action. The diverted flow screening action of this earlier patent may be briefly described as involving screening between the inner wall of a screen cylinder 232 provided with raw stock supply slots which, in the modification illustrated, would comprise the fine slot ends of the compound slots 76 from which the compound slot screened stock issues, and the outer wall of a cooperating screen cylinder 233 with the two screen cylinders in relative rotation, one against the other, providing an intervening space 235 into which the stock passes from any supply slot to an adjacent accepted stock groove 237 in the same screen cylinder 232. As herein shown, the accepted stock grooves 237 are interposed between supply slots 76 for this purpose, with a screening action taking place upon the entry of the stock into the space 235 between the two cooperating screen cylinders. The screen cylinder 233, cooperating with the generally slotted and grooved screen cylinder 232, is provided with at least one reject receiving slot 239 for receiving the reject material as the screen retained material is flushed by a flow from any inlet slot into a reject receiving slot as these two pass operationally. It will be seen that the modified form of a screen cylinder 232 provided with compound screen slots 76 to accommodate the dual screening action consists merely of providing accepted stock grooves 237 between the compound slots 76 in an appropriate spaced relationship. The advantage of such dual, compound slot and diverted flow screening lies primarily in the fact that the fibers passing the compound slot stage are particularly well aligned with the flow so that the fibers are readily accepted by the second or diverted flow stage when the fibers are sufficiently fine and operating conditions are suitable.

While the embodiments of the invention herein illustrated and described preferably may include backwash receiving and collecting apparatus, the present invention also contemplates use of a pulp screening unit embodying the present compound screening slots without backwash receiving apparatus wherein the backwash may be discharged or returned directly back into the mass of raw stock, and wherein other known means are provided to remove the unacceptable portions of the raw stock.

From the above description it will be seen that the present invention provides a novel and improved pulp screening element particularly adapted for fine screening operations. It will also be seen that the present screening unit provides a progressively diminishing path through which the raw stock is fed during the screening operation, the path diminishing in proportion to the amount of stock withdrawn through the compound screening slots whereby better uniformity of the raw stock flow velocity at the screen periphery may be maintained in a controlled relationship to the velocity of the screen periphery, thus permitting a reliably good entry of the stock into the screening slots as regard the hazard of fibers being engaged by the entrance of the entry slots.

While the selected embodiment of the invention has been herein illustrated and described, it will be understood that the invention may be embodied in other forms within the scope of the following claims.

Having thus described the invention, what is claimed is:

1. A pulp screening unit for screening a fibrous pulp stock comprising a rotary hollow cylindrical pulp screening element having a plurality of substantially equally spaced radial screening slots, said slots being longitudinally elongated for a substantial distance of the longitudinal extension of said cylindrical element, each slot having a wide entrance portion provided with substantially parallel, flat opposed side walls and into which the pulp stock is received, an intermediate shoulder portion, and a relatively narrow exit screening portion having opposed substantially parallel, flat side walls and from which the screened pulp is discharged, the walls of the wide entrance portion and the narrow exit portion being substantially parallel to each other, and all of said walls being substantially symmetrically disposed about a midstream center plane on both sides thereof.

2. A pulp screening unit as defined in claim 1 in which the screening element has an open groove formed therein disposed between the narrow portions of adjacent screening slots.

3. A pulp screening unit as defined in claim 1 wherein the intermediate shoulder portion comprises opposed tapered walls connecting the walls of the entrance portion with the walls of the screening portion.

4. A pulp screening unit as defined in claim 3 wherein the junctions of the wide side walls of the entrance portion with the walls of the adjacent ends of the tapered portion are rounded.

5. In a pulp screening unit for screening a fibrous pulp stock suspended in water, a rotary hollow cylindrical pulp screening element having a plurality of substantially equally spaced radial screening slots, said slots being longitudinally elongated for a substantial distance of the longitudinal extension of said cylindrical element, each slot having a wide entrance portion provided with substantially parallel, flat opposed side walls into which the pulp stock is received, an intermediate shoulder portion comprising walls that converge in a direction away from said wide entrance portion, and a relatively narrow fine screening portion through which the pulp stock is discharged, the walls of the wide entrance portion and the narrow exit portion being substantially parallel to each other, and all of said walls being substantially symmetrically disposed about a midstream center plane on both sides thereof.

6. A pulp screening unit for screening pulp stock comprising a rotary hollow cylindrical screening element having a plurality of substantially equally spaced radial screening slots, said slots being longitudinally elongated for a substantial distance of the longitudinal extension of said cylindrical element, each slot having a wide entrance portion provided with substantially parallel, flat opposed side walls into which the pulp stock is received, an intermediate shoulder portion, and a relatively narrow screening portion from which the screened pulp is discharged, said screening portion having opposed substantially parallel, flat, side walls and being of an axial length greater than the length of the fibers of the pulp stock, the walls of the wide entrance portion and the narrow exit portion being substantially parallel to each other, and all of said walls being substantially symmetrically disposed about a midstream center plane on both sides thereof.

7. A pulp screening unit for screening a fibrous pulp stock comprising a hollow cylindrical pulp screening element having a plurality of longitudinally elongated radial screening slots, each slot having a wide entrance portion into which the pulp stock is received, an intermediate shoulder portion and a relatively narrow screening exit portion through which the screened pulp is discharged, said slots extending lengthwise of the cylindrical element, means for introducing raw stock into said wide entrance portions of the screening slots including a plurality of tapered header passages circumferentially arranged about one cylindrical face of said screen cylinder, each header passage converging in the direction in which the screen element is rotated as the raw stock is progressively removed from said raw stock header passages whereby improved uniformity of the raw stock flow velocity at the screen face may be maintained in a controlled relationship to the velocity of said screen face, and a backwashing station interposed between the narrow end of each of said tapered header passages and the adjacent wide end of each tapered header passage, each backwashing station including a backwash emitter for cylically introducing flushing fluid into the narrow end of successive screen slots and a backwasher receiver for removing the flushed screen retained materials through the wide ends of said screen slots.

8. A pulp screening unit for screening a fibrous pulp stock comprising a hollow cylindrical pulp screening element having a plurality of longitudinally elongated radial screening slots, each slot having a wide entrance portion into which the pulp stock is received, an intermediate shoulder portion and a relatively narrow screening portion through which the screened pulp is discharged, said slots extending lengthwise of the cylindrical element, means for introducing raw stock into said wide entrance portions including a tapered header passage circumferentially arranged about one cylindrical face of said cylindrical screening element, said header passage converging in the direction in which the screening element is rotated as the raw stock is progressively removed from said header passage whereby improved uniformity of the raw stock flow velocity at the screen face may be maintained in a controlled relationship to the velocity of said screen face, and a backwashing station interposed between the narrow end of said tapered header passage and the wide end thereof, said backwashing station including a backwash emitter for cyclically introducing flushing fluid into the narrow end of successive screen slots, and a backwash receiver for removing the flushed screen retained materials through the wide ends of said screen slots.

9. A pulp screening unit for screening a fibrous pulp stock comprising a casing having an inlet and an outlet, a hollow cylindrical screening element rotatably mounted in said casing and having a plurality of circumferentially spaced screening slots into which raw stock is received and from which the screened stock is discharged into the interior of said screening element, said casing being formed to provide a tapered header passage circumferentially arranged around the periphery of said screening element with the wide end of the passage in communication with said inlet, said header passage converging in the direction in which the screening element is rotated as the raw stock is progressively removed from the header passage for flow through said screening slots whereby uniformity of the raw stock flow velocity at the screen periphery may be maintained in a controlled relationship to the velocity of said screen periphery, and a backwashing station interposed between the narrow end of said tapered header passage and the wide end thereof, said backwashing station including a backwash emitter for cyclically introducing flushing fluid into the discharging ends of successive screen slots, and a backwash receiver for removing the flushed screen retained materials through the receiving ends of said screen slots, and a wiping lip closely spaced to said screen periphery in advance of the backwash flow position, at the termination of the header passage, whereby fiber retained on the forward edges of the screening slots may be wiped into backwashing position, fibers retained on the trailing edges being eliminated by said controlled relationship of the header flow and screen peripheral velocities.

10. A pulp screening unit for screening a fibrous pulp stock comprising a hollow cylindrical pulp screening element having a plurality of screening slots, each slot having an entrance portion into which the pulp stock is received, and a screening exit portion through which the screened pulp stock is discharged into the interior of said screening element, means for introducing raw pulp stock into said entrance portions including a tapered header passage circumferentially arranged around the periphery of said cylindrical screening element, said header passage converging in the direction in which the screening element is rotated as the raw stock is progressively removed from said header passage for flow through said screening slots, whereby improved uniformity of the raw stock flow velocity at the screen periphery may be maintained in a controlled relationship to the velocity of said screen periphery, and a backwashing station interposed between the narrow end of said tapered header passage and the wide end thereof, said backwashing station including a backwash emitter for cyclically introducing flushing fluid into the discharge end of successive screen slots, and a backwash receiver for removing the flushed screen retained materials through the entrance ends of said screen slots, and a wiping lip closely spaced to said screen periphery in advance of the backwash flow position, at the termination of the header passage, whereby fiber retained on the forward edges of the screening slots may be wiped into a backwashing position, fibers retained on the trailing edges being eliminated by said controlled relationship of the header flow and screen peripheral velocities.

References Cited by the Examiner

UNITED STATES PATENTS

| | | | |
|---|---|---|---|
| 360,089 | 3/1887 | Edmunds | 209—385 X |
| 381,737 | 3/1888 | Williams | 29—163.5 |
| 1,421,364 | 7/1922 | Allen | 210—402 |
| 1,723,311 | 8/1929 | Stine | 29—163.5 |
| 2,053,664 | 9/1936 | Miller | 210—391 X |
| 2,167,322 | 7/1939 | Cuno | 210—393 X |
| 2,230,647 | 2/1941 | Knight | 209—385 X |
| 2,275,776 | 3/1942 | Lane | 162—318 X |
| 2,525,701 | 10/1950 | Mathewson | 209—303 |
| 2,649,670 | 8/1953 | Martin | 29—163.5 X |
| 2,707,905 | 5/1955 | Mathewson | 209—397 |
| 2,991,218 | 7/1961 | Cirrito | 162—318 |

FOREIGN PATENTS 710,540  6/1954  Great Britain.

HARRY B. THORNTON, *Primary Examiner.*

REUBEN FRIEDMAN, *Examiner.*

ROBERT HALPER, *Assistant Examiner.*

UNITED STATES PATENT OFFICE
CERTIFICATE OF CORRECTION

Patent No. 3,276,584                                                  October 4, 1966

Wilfred F. Mathewson

It is hereby certified that error appears in the above numbered patent requiring correction and that the said Letters Patent should read as corrected below.

Column 2, line 57, for "contacts" read -- contracts --; column 3, line 33, for "exteremely" read -- extremely --; line 70, for "screning" read -- screening --; column 4, line 56, for "cylinder," read -- cylinder --; column 9, line 33, for "and" read -- end --.

Signed and sealed this 5th day of September 1967.

(SEAL)
Attest:

ERNEST W. SWIDER                                              EDWARD J. BRENNER
Attesting Officer                                                  Commissioner of Patents